(12) United States Patent
Ayazi et al.

(10) Patent No.: US 8,680,752 B2
(45) Date of Patent: Mar. 25, 2014

(54) PIEZOELECTRIC MICROMECHANICAL ENERGY HARVESTERS

(75) Inventors: Farrokh Ayazi, Atlanta, GA (US); Logan Sorenson, Atlanta, GA (US); Jenna Fu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 32 days.

(21) Appl. No.: 13/372,436

(22) Filed: Feb. 13, 2012

(65) Prior Publication Data

US 2012/0206016 A1      Aug. 16, 2012

Related U.S. Application Data

(60) Provisional application No. 61/441,810, filed on Feb. 11, 2011.

(51) Int. Cl.
*H01L 41/113*        (2006.01)

(52) U.S. Cl.
USPC ............................. 310/339; 310/367; 310/369

(58) Field of Classification Search
USPC ........................................ 310/339, 367, 369
See application file for complete search history.

(56) References Cited

U.S. PATENT DOCUMENTS

| | | | | |
|---|---|---|---|---|
| 4,368,525 | A * | 1/1983 | Obata et al. | 367/165 |
| 8,183,746 | B2 * | 5/2012 | Rastegar | 310/339 |
| 2005/0067901 | A1 * | 3/2005 | Harris et al. | 307/125 |
| 2008/0136292 | A1 * | 6/2008 | Thiesen | 310/334 |
| 2008/0277941 | A1 * | 11/2008 | Bowles et al. | 290/54 |
| 2009/0211353 | A1 * | 8/2009 | Gao et al. | 73/146.5 |
| 2010/0084947 | A1 * | 4/2010 | Yoon et al. | 310/339 |
| 2011/0101827 | A1 * | 5/2011 | Yoon et al. | 310/339 |
| 2011/0215590 | A1 * | 9/2011 | Arnold et al. | 290/1 R |
| 2012/0068576 | A1 * | 3/2012 | Lee | 310/339 |
| 2012/0161583 | A1 * | 6/2012 | Kang et al. | 310/339 |
| 2012/0267900 | A1 * | 10/2012 | Huffman et al. | 290/1 R |
| 2012/0326536 | A1 * | 12/2012 | Nair et al. | 310/26 |

* cited by examiner

*Primary Examiner* — Thomas Dougherty
(74) *Attorney, Agent, or Firm* — Troutman Sanders LLP; Ryan A. Schneider

(57) ABSTRACT

The present invention comprises systems, apparatuses, and methods for harvesting ambient mechanical energy at a lower frequency and transforming the harvested energy into electrical energy at a higher frequency. Transforming the energy from relatively lower input frequency energy to relatively higher output frequency energy can help realize greater efficiencies found at higher frequencies. Because the input plane of the ambient mechanical energy is not always predictable, some embodiments of the present invention comprise both in-plane and out-of-plane energy harvesters that produce an electrical output in multiple planes.

33 Claims, 20 Drawing Sheets

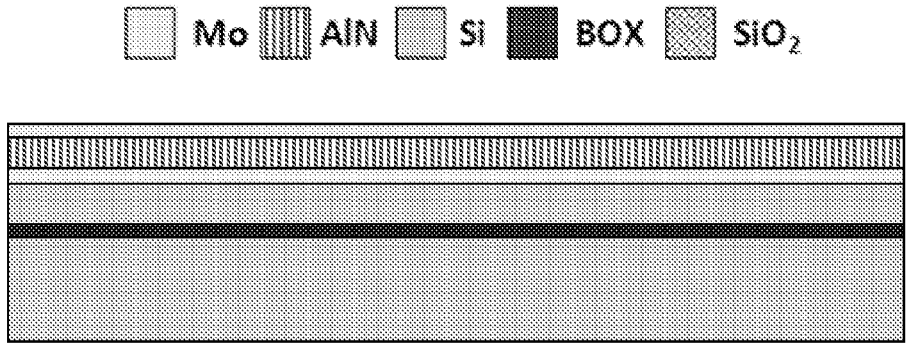
1. SOI Wafer with Mo/AlN/Mo
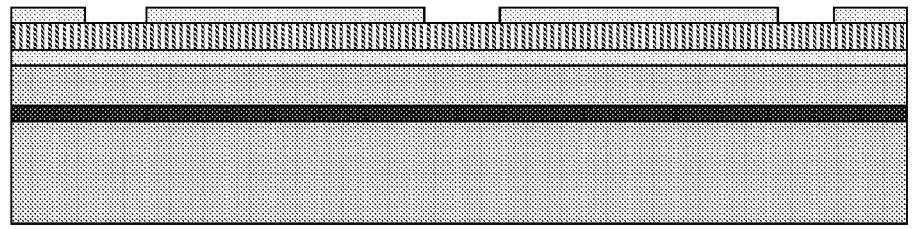
2. Pattern Mo top electrode
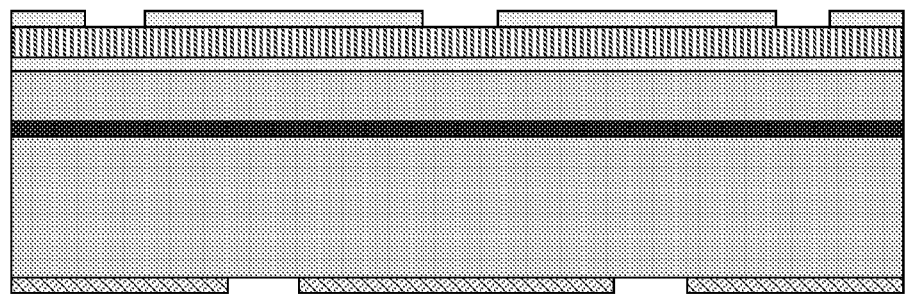
3. Deposit and pattern backside oxide
FIG. 17

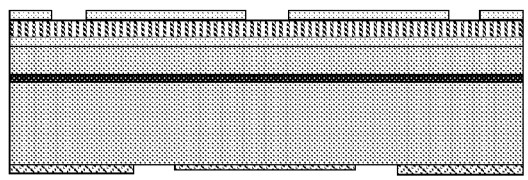
4. Backside oxide reduction step
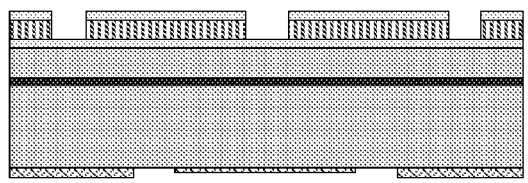
5. Expose bottom electrode
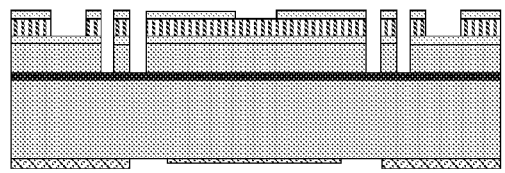
6. Etch trenches to define device
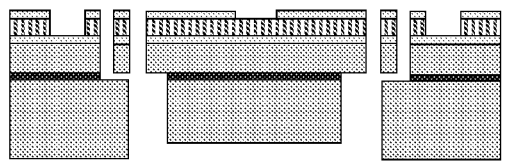
7. Etch backside Si and BOX, completely release from topside in HF
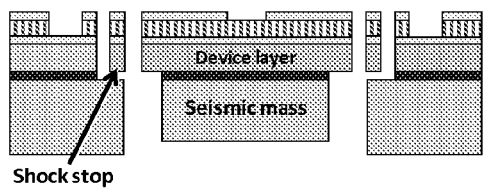
8. Process Finished
FIG. 18

PIEZOELECTRIC MICROMECHANICAL ENERGY HARVESTERS

CROSS-REFERENCE TO RELATED APPLICATIONS

This application claims the benefit of U.S. Provisional Application No. 61/441,810 filed 11 Feb. 2011, the entire contents and substance of which are hereby incorporated by reference.

This invention was made with Government support under Agreement No. HR0011-10-3-0002, awarded by DARPA. The Government has certain rights in the invention.

BACKGROUND OF THE INVENTION

1. Field of the Invention

This invention relates generally to the field of energy harvesters, and more specifically to micromechanical energy harvesters.

2. Description of Related Art

Decades of research and development have been conducted in an attempt to harvest, i.e. collect, energy that exists in various forms in our environment. Solar cell technology is one of the more prevalent and well-known forms of energy harvesters, collecting solar energy and converting that energy into heat, electricity, or both. Another prevalent, but perhaps less known, energy harvester is the water turbine used in dam electric power plants. Moving water from a river or lake rotates a water turbine to produce electricity. Geothermal heating units installed in houses use a relatively new type of energy harvester. The geothermal heating unit recirculates a heat medium through a warmer area found deep beneath the surface layer.

Readily-available, low-frequency mechanical energy, such as the 1-2 Hz vibration source from walking, can be transformed into useful power for portable and wireless microsystems. Conventional energy harvesters traditionally operate as a single-degree-of-freedom ("single-DOF") system to harvest environmental energy, such as vibrations, which can and do occur across multiple-degrees-of-freedom ("multi-DOF"). They are typically further limited by operating within a narrow frequency band about the resonance frequency of the single-DOF system. The efficiency of mechanical energy harvesters usually increase with frequency, but because the amount of useful environmental energy decreases with frequency, conventional energy harvesters sometimes use "upconversion" techniques to convert the relatively lower environmental ambient energy frequency to a more efficient, higher energy output frequency.

BRIEF SUMMARY OF THE INVENTION

Briefly described, in exemplary form, the present invention comprises systems, apparatuses, and methods for harvesting ambient mechanical energy at a first frequency and transforming that harvested energy into electrical energy at a second frequency. Transforming the energy from relatively lower input frequency energy to relatively higher output frequency energy can help realize greater efficiencies found at higher frequencies. Because the input plane of the ambient mechanical energy is not always predictable, some embodiments of the present invention comprise both in-plane and out-of-plane energy harvesters that produce an electrical output in multiple planes.

Because of their compatibility with piezoelectric micromechanical RF resonator and sensor devices, various embodiments of the present invention are suitable for a platform where sensors are integrated with harvesters on the same integrated circuit chip or even on a single device.

Various embodiments of the present invention comprise a micromechanical energy harvester in which one or more of the components of the harvester or monolithically integrated in a single substrate. In some embodiments, a single substrate can be used to produce the entire harvester assembly, including the proof mass, transducer and transfer mechanism.

In further embodiments, the transducer and proof mass are in a common plane with a single substrate. In some embodiments, because one or more of the components of the energy harvester can be in a single plane, a piezoelectric material can be deposited onto the substrate to enable one or more of the components to produce an electrical output.

In various exemplary embodiments, the relatively lower frequency ambient mechanical energy is converted to a relatively higher frequency output energy using the resonance frequency of one or more components. A proof mass of an energy harvester device is accelerated relative to one or more components of the energy harvester. The acceleration of the proof mass can be caused by forces acting on the proof mass itself, causing acceleration of the proof mass in relation to the energy harvester, or by forces acting on the energy harvester, causing the energy harvester to accelerate in relation to the proof mass. This acceleration imparts a kinetic energy within either the energy harvester or the proof mass, depending on which part moves. Energy harvesters of the present invention then transfer the kinetic energy of the moving component into a transducer component that vibrates at a resonance frequency, creating electrical energy output at a relatively higher frequency.

In one exemplary embodiment, the present invention is a mechanical energy harvester comprising a proof mass that receives ambient mechanical energy at a first frequency in a first plane, a transducer comprising piezoelectric material, and a transfer mechanism that transfers the received ambient mechanical energy to the transducer, causing the transducer to vibrate at the resonance frequency to create an electrical output energy at the second, or resonance, frequency. The proof mass absorbs a portion of the ambient mechanical energy, causing the proof mass to vibrate. In some instances, the proof mass vibrates as a result of its adherence to Newton's First Law of Motion. When ambient mechanical energy impacts the energy harvester, various components of the energy harvester are accelerated in a direction due to the absorption of the energy. The proof mass does not initially move (or moves very little), effectively accelerating it in a direction opposite to the direction of the force. Once the acceleration of the harvester stops, the proof mass accelerates in the opposite direction (i.e. the direction of the initially applied force) and starts to vibrate.

In one exemplary embodiment, the energy harvester proof mass comprises a beam having a first mass at a first end of the beam and a second mass at a second, opposite end of the beam, wherein the first mass is greater than the second mass. In this exemplary embodiment, the transfer mechanism comprises a side wall of the mechanical energy harvester that receives an impact from the first mass when the first mass is accelerated towards the side wall due to the received ambient mechanical energy. In another exemplary embodiment, the transfer mechanism further comprises a deformation of the beam caused by the striking of the first mass against the side wall, wherein the deformation causes the second end of the proof mass to vibrate at the resonance, or second, frequency. In a still further embodiment, the transfer mechanism further comprises a first spring that connects the proof mass to the transducer, wherein the spring compresses and relaxes due to the vibration of the second end of the proof mass. In an additional embodiment, the transfer mechanism further comprises a plurality of second springs attached to the proof mass.

In another exemplary embodiment, the proof mass is a seismic mass that vibrates within the first plane upon receiving the ambient mechanical energy. This exemplary embodiment further comprises a proof mass micro-pick attached to the proof mass and a transducer micro-pick attached to the transducer. In this exemplary embodiment, the proof mass micro-pick causes the transducer to vibrate at the second frequency by striking the transducer micro-pick when the received ambient mechanical energy is of a predetermined value.

This exemplary embodiment can further comprise one or more second transducers that vibrate at a third frequency, a plurality of second proof mass micro-picks attached to the proof mass and/or a plurality of second transducer micro-picks attached to the one or more second transducers. In this exemplary embodiment, the plurality of second proof mass micro-picks load the plurality of second transducer micro-picks upon vibration of the proof mass, causing the one or more second transducers to vibrate at the third frequency.

This exemplary embodiment can additionally comprise a second seismic mass that vibrates within a second plane upon receiving the ambient mechanical energy in a second plane. This embodiment can further comprise a second transducer comprising piezoelectric material. The second transducer can vibrate at a third frequency.

In another exemplary embodiment, the transducer and transfer mechanism can comprise a plurality of beam transducers attached to the proof mass, wherein the proof mass vibrates at the first frequency and one or more of the beam transducers vibrate at the second frequency.

In some embodiments, the piezoelectric material is selected from the group comprising lead zirconate titanate, zinc oxide, aluminum nitride, lead magnesium niobate-lead titanate, gallium phosphate, quartz, tourmaline, and polymers such as polyvinylidene fluoride and its copolymers.

Some embodiments of the present invention are an electrical energy generation device comprising a mechanical energy harvester and an electrical system connected to the mechanical energy harvester to receive electrical energy from the mechanical energy harvester, wherein the mechanical energy harvester comprises a proof mass that receives ambient mechanical energy at a first frequency in a first plane, a transducer comprising piezoelectric material, wherein the transducer vibrates at a second, resonance, frequency, and a transfer mechanism that transfers the received ambient mechanical energy to the transducer, causing the transducer to vibrate at the resonance frequency to create an output current at the second frequency to upconvert the ambient mechanical energy at the first frequency to the output current at a second frequency.

One embodiment of the present invention is a method for harvesting ambient mechanical energy. The method comprises vibrating a proof mass at a first frequency in a first plane upon receipt of the ambient mechanical energy at the proof mass, providing a transducer comprising piezoelectric material, wherein the transducer vibrates at a second, resonance, frequency, and transferring the received ambient mechanical energy to the transducer, causing the transducer to vibrate at the resonance frequency to create an output voltage at the second frequency to upconvert the ambient mechanical energy at the first frequency to the output voltage at a second frequency.

These and other objects, features and advantages of the present invention will become more apparent upon reading the following specification in conjunction with the accompanying drawing figures.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and furthermore, are not intended in any manner to limit the scope of the presently disclosed subject matter.

FIGS. 17-18 illustrate processing steps to create an exemplary energy harvester, according to an embodiment of the present invention.

DETAILED DESCRIPTION OF THE INVENTION

Figure 1:
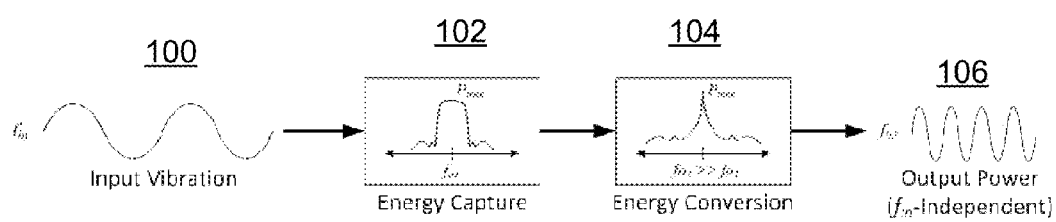
FIG. 1 illustrates the fundamentals of ambient energy harvesting.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Disclosed are systems, apparatuses, and methods for harvesting ambient mechanical energy at a lower frequency and transforming that harvested energy into electrical energy at a higher frequency. Transforming the energy from relatively lower input frequency energy to relatively higher output frequency energy can help realize greater efficiencies found at higher frequencies. The ambient mechanical energy causes the acceleration of a portion of a mechanical energy harvester. In some embodiments, the acceleration can be either the system surrounding a proof mass or the proof mass itself. Regardless of the means in which acceleration occurs, the relative velocity between the proof mass and a transfer mechanism causes the proof mass to impart energy to a transducer. Upon receipt of the energy from the proof mass, the transducer is configured to vibrate at a particular resonance frequency. If it is desirable to upconvert the energy, i.e. transform a low frequency input into a high frequency output, the transducer can be configured to have a high, natural resonance value.

FIG. 1 illustrates the fundamentals of ambient energy harvesting. Relatively low frequency ambient mechanical energy is received 100 at an energy harvester. The mechanical energy received can originate from various sources, including, but not limited to, physical movement, impact, rotational movement, compression or stress of a device, and vibrational output of a machine. The mechanical energy is captured 102 by an energy harvester. In the present invention, the energy is captured by the interaction between a proof mass and a transducer. The proof mass is accelerated as a result of the input. This acceleration is used to convert 104 the input energy to an electrical output 106. By configuring a piezoelectric transducer, the frequency of energy received by the harvester can be upconverted to a higher output energy frequency. It should be understood that the present invention is not limited to the use of piezoelectric transducers, as other types of transducers can be used, including, but not limited to, electromagnetically-actuated devices.

FIGS. 2a, 2b, 2c and 2d illustrate an exemplary mechanical energy harvester using double spiral pivot springs, according to an exemplary embodiment of the present invention. The energy harvester of FIG. 2a comprises a beam 200 with a first mass 202 at first end 204 of beam 200 and second mass 206 at second end 208. In some embodiments, the mass of first mass 202 is greater than the mass of second mass 206. With the mass of first mass 202 being greater than the mass of second mass 208, first mass 202 will have a lower resonance frequency than second mass 208. This provides the upconversion feature desired in some embodiments whereby lower frequency energy received from the environment is converted to higher output frequency energy. Springs 210a and 210b provide lateral support for beam 200 and allow the acceleration of first mass 202 towards sidewalls 212.

Figure 2:
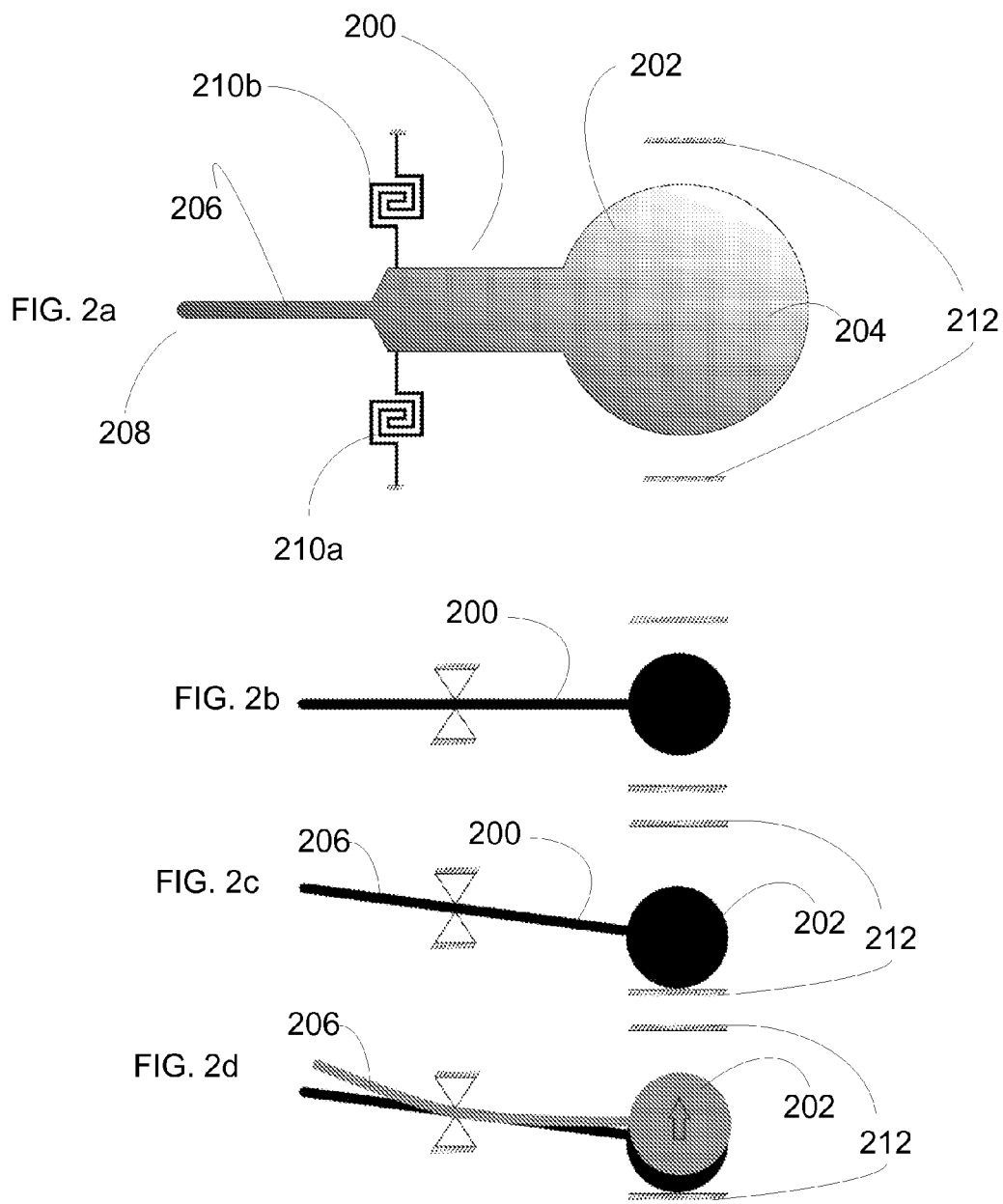
FIGS. 2a, 2b, 2c and 2d illustrate an exemplary mechanical energy harvester using double spiral pivot springs, according to an exemplary embodiment of the present invention.

FIGS. 2b-d show how the received ambient energy is converted to a higher output frequency. FIG. 2b shows beam 200 in a non-moving, rest position prior to receiving ambient mechanical energy. FIG. 2c shows the interaction of the ambient mechanical energy with beam 200. As mechanical energy is received, first mass 202 is accelerated towards sidewalls 212. The acceleration can occur in various ways. For example, sidewalls 212 can be moved as a result of the received mechanical energy. Thus, first mass 202 can be accelerated towards sidewalls 212 in a relative manner. FIG. 2d illustrates how the received energy is converted to a higher frequency. As a result of the acceleration of first mass 202 towards sidewalls 212, first mass 202 strikes sidewalls 212.

The resulting collision (assumed to be elastic) causes the immediate deceleration of first mass 202 and acceleration of first mass 202 in the opposite direction (noted by the arrow). Because of the length of beam 200 and the difference of mass between first mass 202 and second mass 206, second mass 206 does not decelerate in the same manner. Thus, beam 200 bends as a result of the difference of velocities between first mass 202 and second mass 206. The degree of bend resulting from the difference of velocities can vary with the types of materials used to construct beam 200 and the amount of force imparted on beam 200. The energy resulting from the difference of velocities is thereafter transferred back into second mass 206 as a result of beam 200 returning to a straight line. Second mass 206 absorbs the energy in the form of vibrations. Because of the difference in mass, second mass 206 vibrates at a higher frequency than first mass 202, causing an upconversion of the mechanical energy input. This higher vibration is imparted to a transducer element (not shown) that converts the mechanical vibration of second mass 206 into an electrical output.

Figure 3:
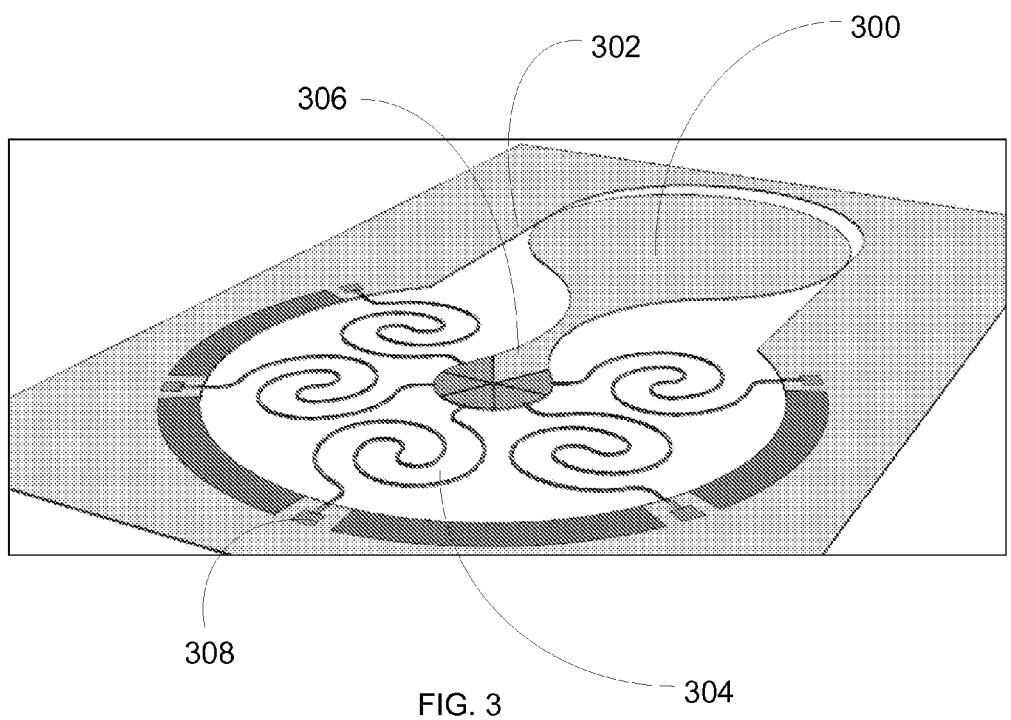
FIG. 3 illustrates another exemplary mechanical energy harvester using multiple pivot springs, according to an exemplary embodiment of the present invention.

FIG. 3 is an illustration of an exemplary energy harvester using collision to upconvert ambient mechanical energy into a relatively higher frequency electrical output. Proof mass 300 is shown disposed next to sidewall 302. In a manner similar to that described in FIGS. 2a-d, above, upon receipt of an external acceleration force, i.e. ambient mechanical energy, proof mass 300 is accelerated towards sidewall 302. The resulting collision causes pivot spring transducers 304 to vibrate at a frequency relative to the difference in mass between proof mass 300 and smaller mass 306. Spring transducer 304 is constructed of a piezoelectric material that, when stressed and relaxed, produces an electrical output. In some embodiments, the piezoelectric material is selected from the group comprising lead zirconate titanate, aluminum nitride, zinc oxide, lead magnesium niobate-lead titanate, gallium phosphate, quartz, tourmaline, and polymers such as polyvinylidene fluoride and its copolymers.

The electrical output is received by an outside system at signal output 308. In various embodiments, there can be a plurality of second transducers, creating a plurality of signal outputs. In still further embodiments, the mass of the spring transducers and the materials used to construct the spring transducers, such as spring transducer 304, can be different to provide different output signal frequencies.

Figure 4:
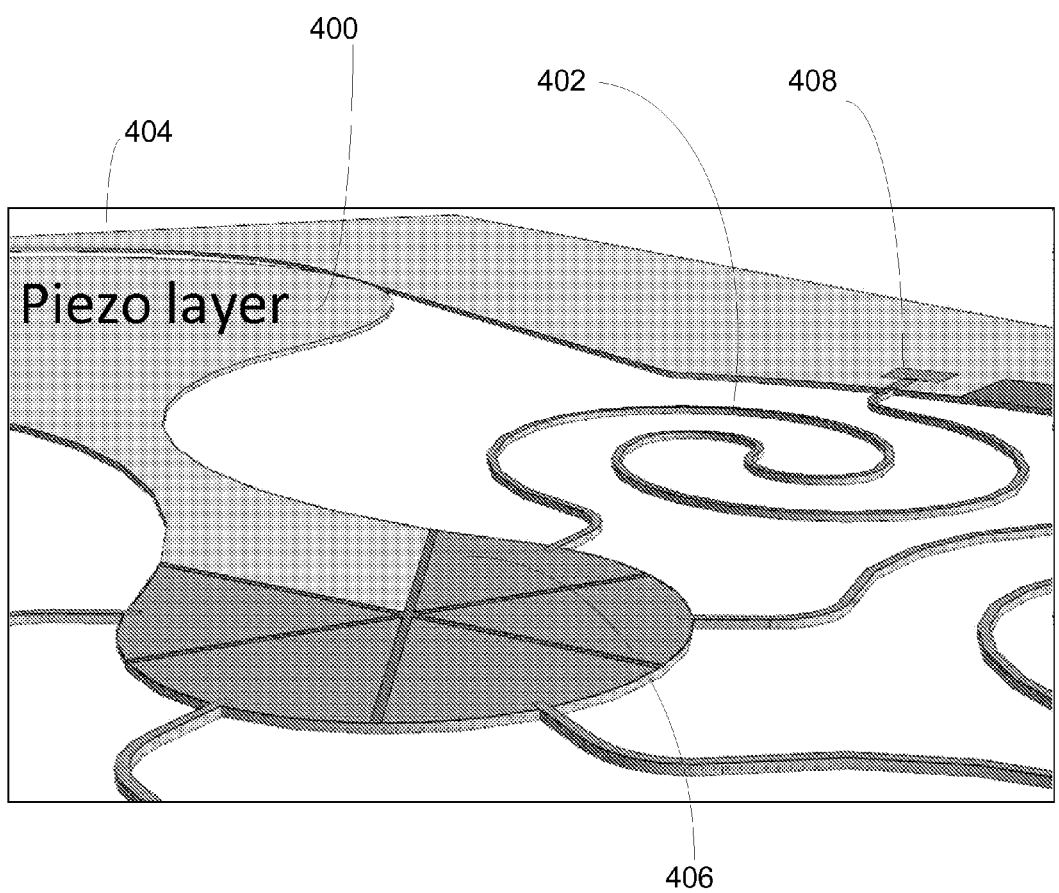
FIG. 4 is a close-view illustration of the mechanical energy harvester of FIG. 3, according to an embodiment of the present invention.
Figure 5A:
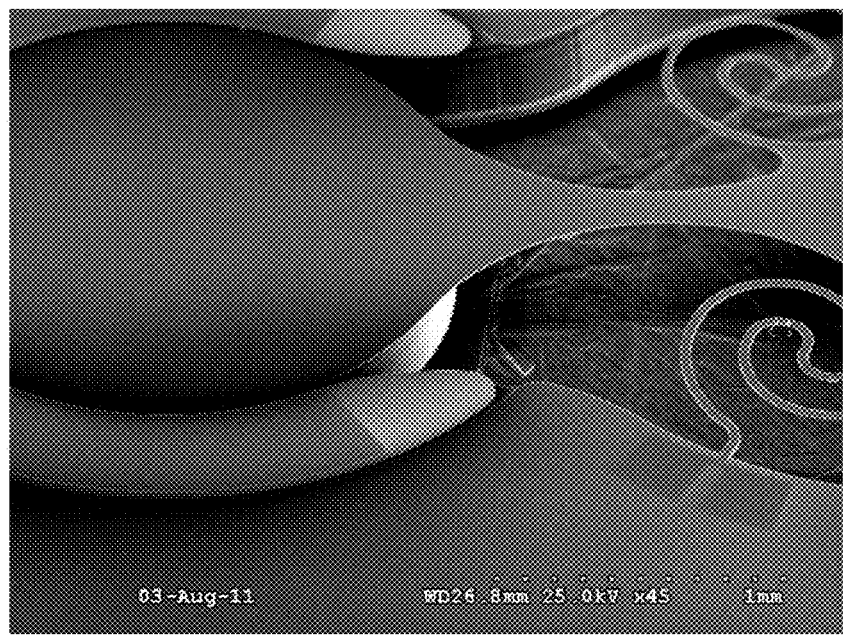
FIGS. 5a and 5b are images of an exemplary mechanical energy harvester taken from a scanning electron microscope, according to an embodiment of the present invention.
Figure 5B:
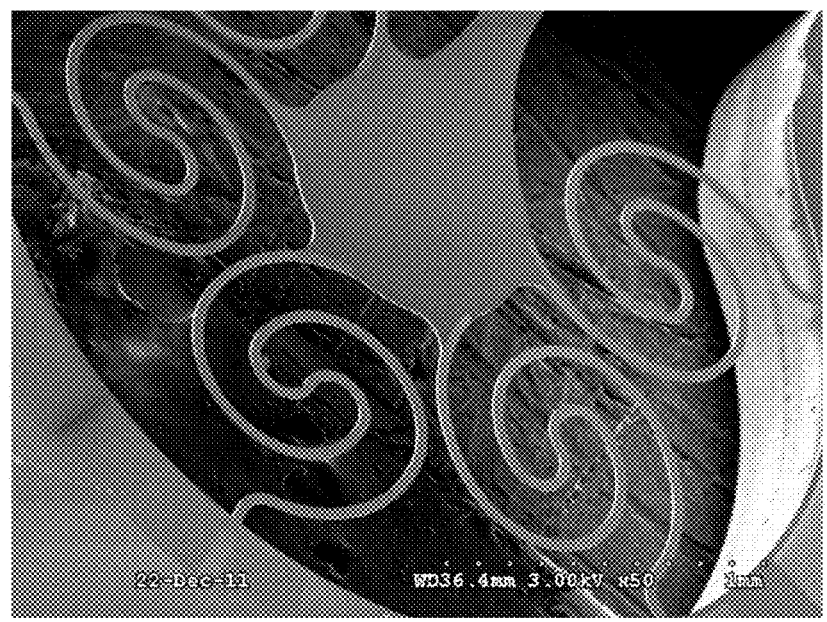

FIG. 4 is a close up illustration of an energy harvester similar to that shown in FIG. 3. Illustrated are proof mass 400 and spring transducers 402. In this embodiment of the present invention, the piezoelectric layer is shown as layer 404. The vibrational energy resulting from spring transducer 404 creates in some parts of piezoelectric layer 404 an electrical energy output. The electrical energy output is electrically transferred from electrical pad 406 through spring transducer 402 to electrical output 408. FIGS. 5a and 5b are scanning electron microscope images of an energy harvester constructed according to the embodiment shown in FIG. 4.

Figure 6:
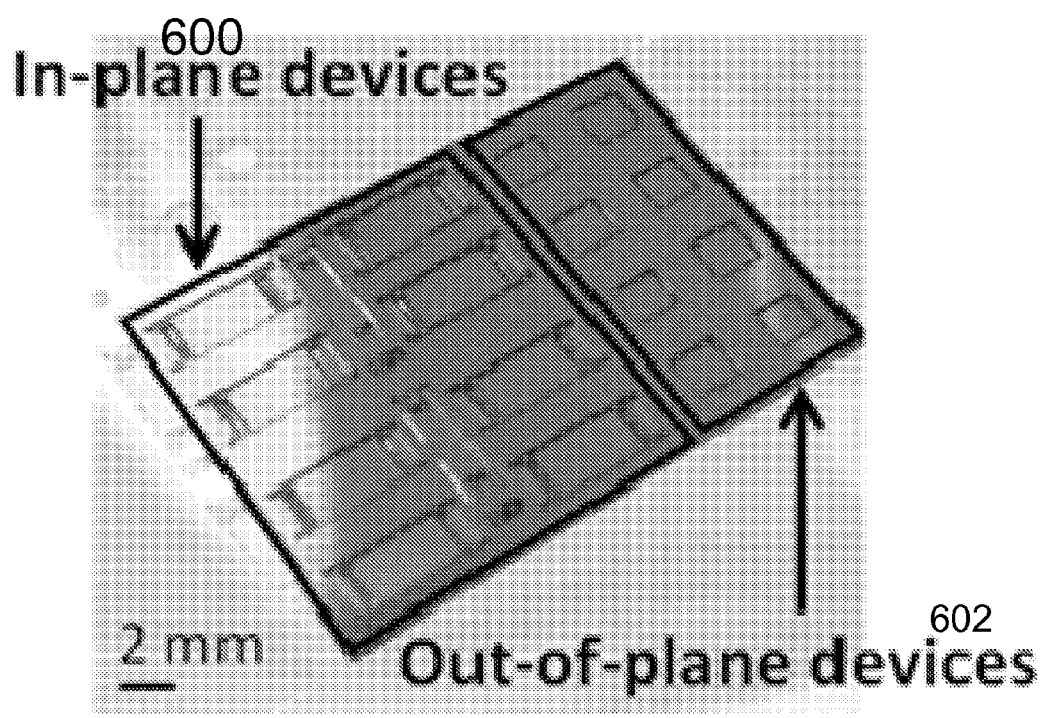
FIG. 6 illustrates a combination of an in-plane and out-of-plane energy harvester system implemented on the same silicon substrate, according to an embodiment of the present invention.

In an uncontrolled environment, the plane in which ambient mechanical energy is received cannot always be determined. Thus, it can be beneficial to attempt to harvest energy in multiple planes of movement. FIG. 6 is an illustration shown a multiple-plane energy harvester. In-plane energy harvester devices 600 harvest energy in first plane while out-of-plane energy harvester devices 602 harvest energy in at least a second plane. Therefore, if in-plane energy harvester devices 600 harvest energy in an "X" plane, by using out-of-plane energy harvester devices 602, energy can be collected in a "Y" plane. This can be particular useful in situations such as human movement or the interaction of a human with their environment. This can also be particular useful in situations in which it is expected that vibrations occurs in multi-DOF such as machinery. For example, energy harvester 602 can have one or more forces acting on it that causes energy harvester 602 to travel in an elliptical path.

Figure 7:
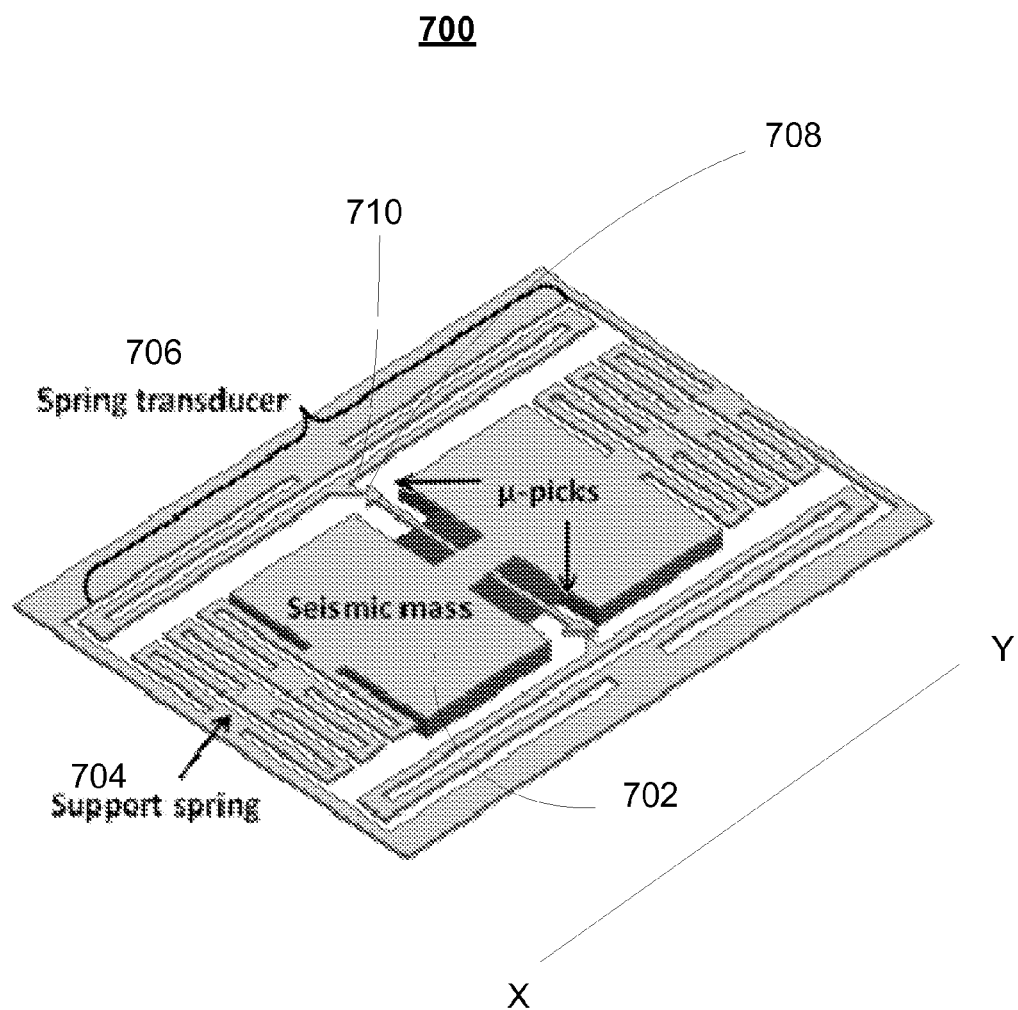
FIG. 7 illustrates an in-plane energy harvester according to a further embodiment of the present invention.

FIG. 7 is an illustration of an exemplary in-plane energy harvester 700. Proof mass 702 (labeled as seismic mass) is attached to energy harvester 700 via support spring 704. Upon receipt of ambient mechanical energy, energy harvester 700 is accelerated in a direction from position "X" to position "Y". Support spring 704 is compressed as a result of the acceleration of energy harvester 700 and proof mass 702 remaining stationary. Once fully compressed or once energy harvester 700 stops accelerating, support spring 704 will uncompress, causing the acceleration of proof mass 702. Proof mass 702 can move in one direction, can move in one direction and then reverse its course, or can move back and forth, e.g. vibrate, for a period of time. The degree and type of movement depend on various factors within harvester 700 including, but not limited to, the amount of energy imparted on it, the frictional and molecular forces that create energy loss, and the amount of energy transferred to other components of harvester 700. The degree and type of movement of proof mass 702 also depends on the mass of proof mass 702 as well as the spring force created by support spring 704.

As proof mass 702 moves, proof mass micro-pick 708 interacts with spring transducer micro-pick 710. The construction of the proof mass micro-pick 708 and the spring transducer micro-pick 710 causes a "snapping" effect. In other words, proof mass micro-pick 708 slightly compresses, e.g. loads, spring transducer 706 when physically moving against spring transducer micro-pick 710. Once proof mass micro-pick 708 passes by spring transducer micro-pick 710, the compressive force is released, e.g. unloads, from spring transducer 706. This causes spring transducer 706 to decompress and begin to vibrate. Because spring transducer 706 comprises piezoelectric material, the vibration, i.e. compression and subsequent decompression, causes an electrical output at the frequency of vibration of spring transducer 706.

It can be desirable in certain situations to have multiple in-line energy harvester systems to, among other reasons, provide electrical energy outputs at various frequencies or to provide for redundancies within the system (i.e. the failure of one in-line energy harvester does not render the entire system inoperable). Therefore, it is anticipated, and within the scope of the present invention, that each component of the energy harvester 700 can be duplicated within energy harvester system 700. For example, an exemplary embodiment of the present invention can have one or more second transducers that vibrate at a different frequency (i.e. third frequency) than the input ambient energy or a first transducer. Another exemplary embodiment can have a plurality of second proof mass micro-picks attached to the proof mass or attached to other proof masses within energy harvester 700. A still further exemplary embodiment can have a plurality of transducer micro-picks attached one or more transducers. In that exemplary embodiment, the plurality of proof mass micro-picks can load the plurality of transducer micro-picks upon vibration of the proof mass, causing the one or more transducers to vibrate at the third frequency.

Figure 8A:
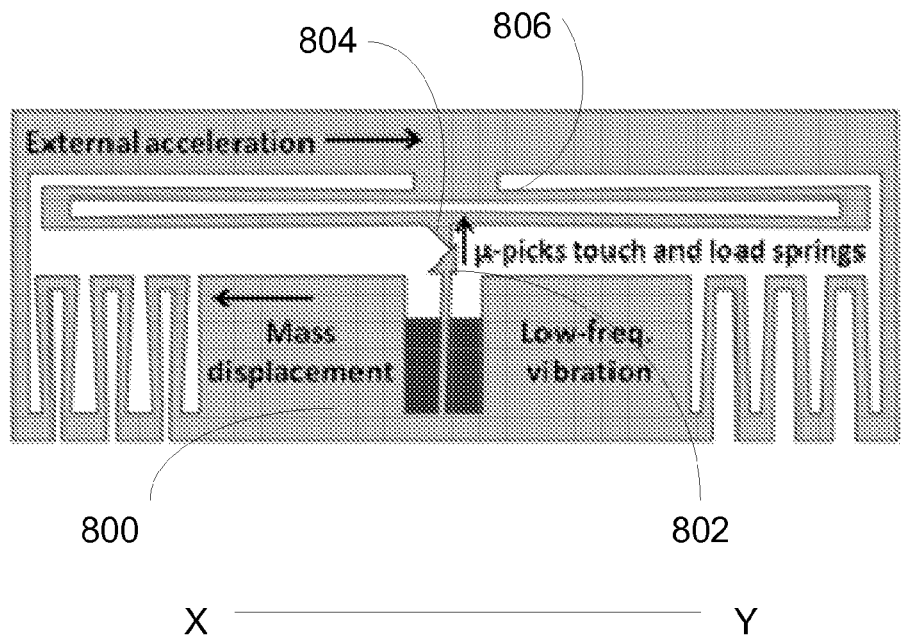
FIGS. 8a and 8b are top views of an in-plane energy harvester showing the transfer of vibrational energy from the proof mass to the transducer, according to an embodiment of the present invention.
Figure 8B:
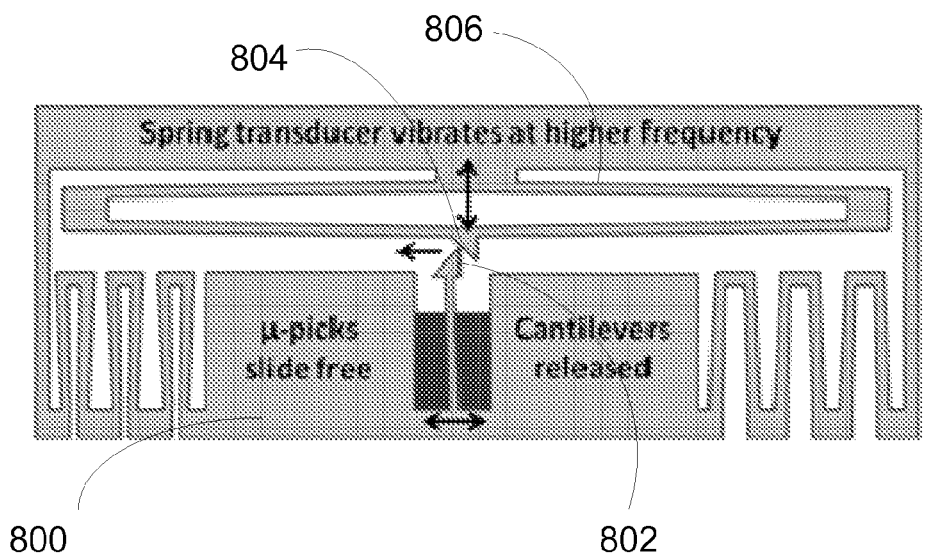

The loading and unloading of a spring transducer, such as spring transducer 706 of FIG. 7, is more fully illustrated in FIGS. 8a and 8b. FIG. 8a shows the loading concept. As proof mass 800 moves back and forth along axis XY, proof mass micro-pick 802 moves against stationary spring transducer micro-pick 804. The geometric configuration of proof mass micro-pick 802 and spring transducer micro-pick 804 cause proof mass micro-pick 802 to push against spring transducer micro-pick 804. This compressive force loads spring transducer 806.

As shown in FIG. 8b, as spring mass 800 moves further along axis XY, proof mass micro-pick 802 disengages from spring transducer micro-pick 804. Upon disengagement of proof mass micro-pick 802 from spring transducer micro-pick 804, spring transducer 806 snaps from its compressed, or loaded state, to a decompressed state. Because of the elastic, spring nature of spring transducer 806, the snapping or unloading action causes spring transducer 806 to vibrate. The vibrational movement of spring transducer 806 imparts a mechanical force on the piezoelectric material of spring transducer 806, thus creating an electrical output having a frequency of the vibrational frequency of spring transducer 806.

Figure 9:
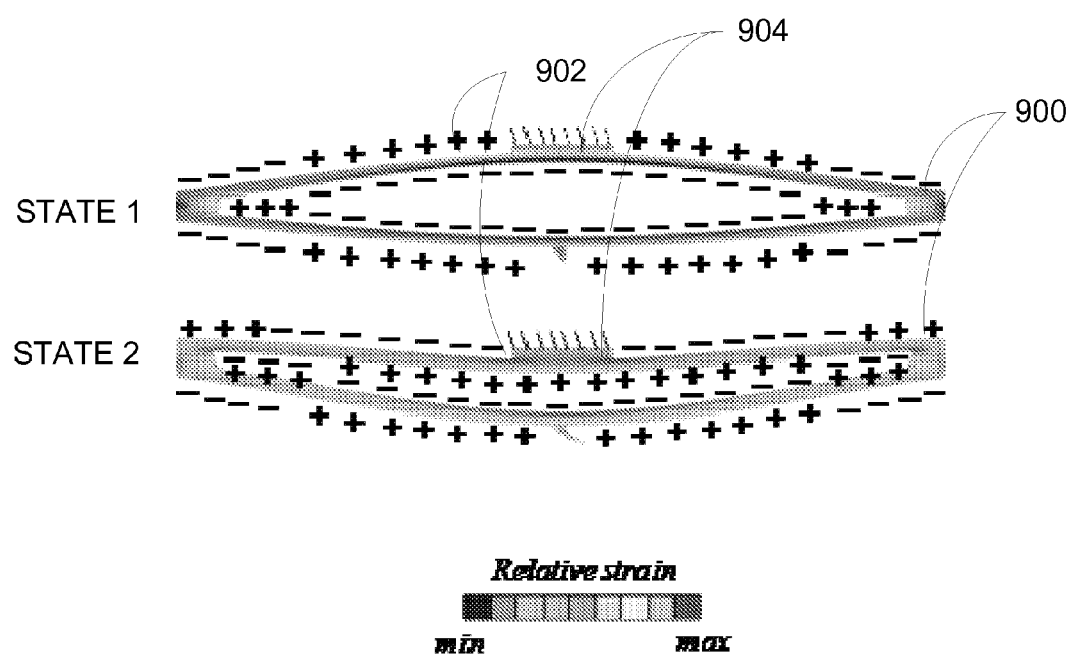
FIG. 9 illustrates how the relation and strain of the transducer creates an electrical output, according to an embodiment of the present invention.

The electrical output creation aspect of spring transducer 806 of FIGS. 8a and 8b is illustrated in FIG. 9. Spring transducer 900 is shown in an extended state achieved after spring transducer 900 is unloaded. The piezoelectric materials comprising spring transducer 900 create charged particles on various surfaces of spring transducer 900. The polarity of the charged particles created depends on whether the surface is compressed or relaxed. For example, electrical output 904 experiences a positive charge at surface 902 in STATE 1. Once spring transducer 900 moves into a compressed state, STATE 2, electrical output 904 experiences a negative charge at surface 904. STATE 1 and STATE 2 describe two different resonance modes. Thus, the output voltage will move from positive to negative, with the frequency being caused by the relaxation and compression of spring transducer 900. It should be noted that various components of spring transducer 900, as well as other components of an energy harvester, can also be coated with piezoelectric material. For example, piezoelectric material can be deposited on the top and sidewalls of spring transducer 900.

Figure 10:
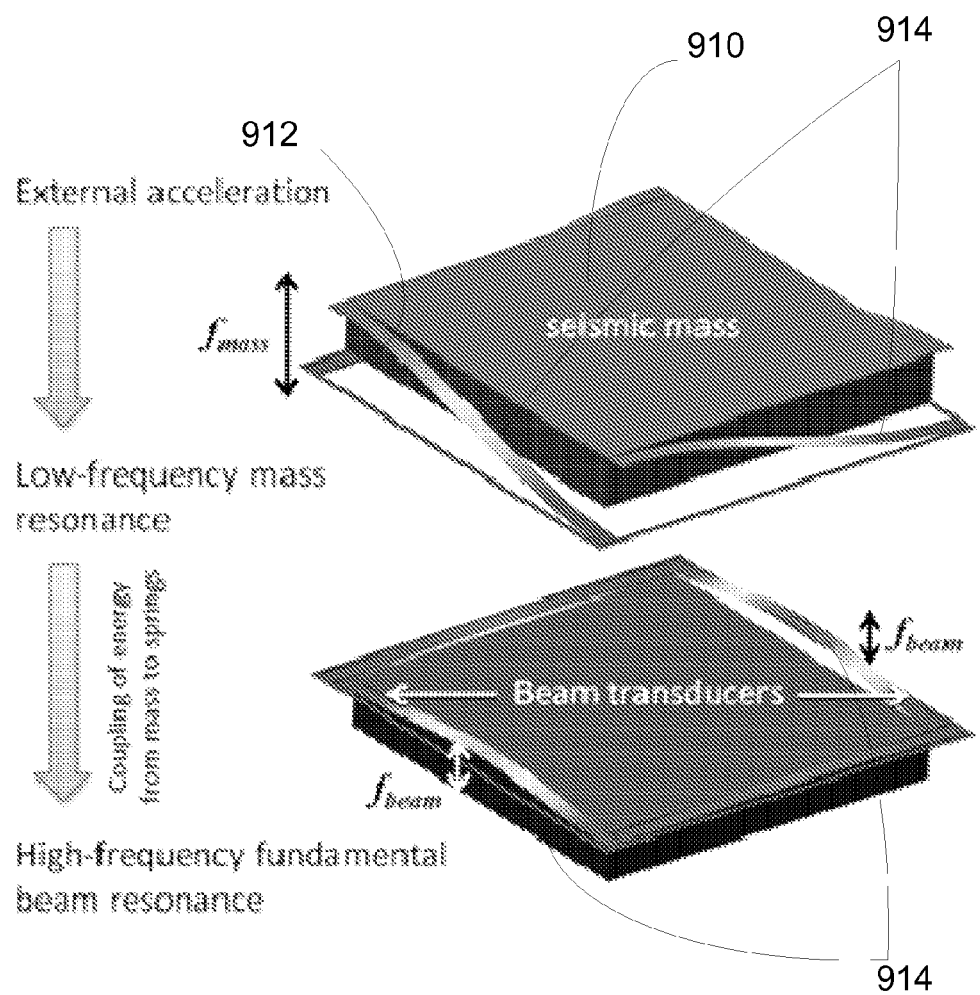
FIG. 10 is an exemplary out-of-plane energy harvester, according to an embodiment of the present invention.
Figure 11:
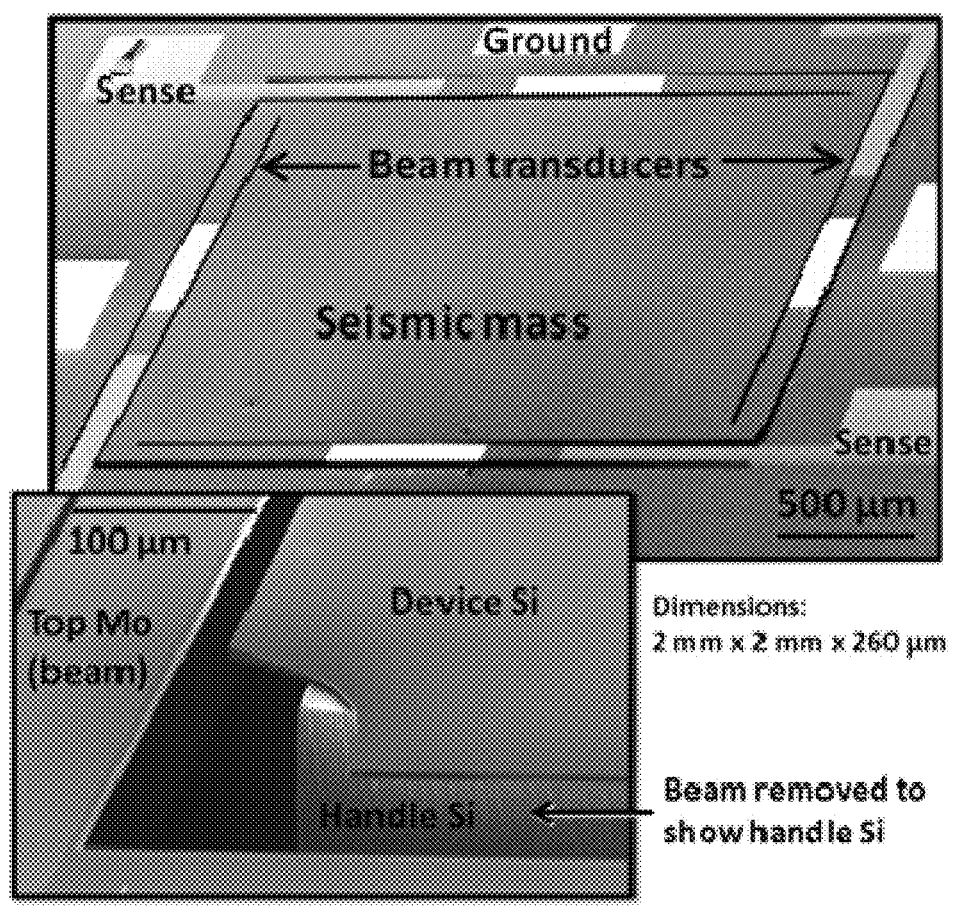
FIG. 11 are images of an out-of-plane energy harvester taken from a scanning electron microscope, according to an embodiment of the present invention.

As discussed above, it can be desirable to provide for multiple-DOF energy harvesting capabilities. Thus, it can be desirable to have both an in-plane and an out-of-plane energy harvester combined within one system, as illustrated by way of example in FIG. 6. FIG. 10 illustrates an exemplary out-of-plane energy harvester. Seismic mass 910 connects to base 904 via flexible beam transducers 914. Beam transducers 914 allow various degrees of freedom of movement for seismic mass 910. In some embodiments, seismic mass 910 can fully or partially rotate about more than one axis or move longitudinally (up and down). The movement of seismic mass 914 in relation to fixed base 904 creates a strain or compression on beam transducers 914. Not limiting the present invention to any particular theory of operation, it is believed that the strain or compression imparted on beam transducers 914 cause beam transducers 914 to vibrate. The vibration of beam transducers 914 create an electrical output at the frequency of vibration of beam transducers 914. FIG. 11 shows scanning electron microscope images of the out-of-plane energy harvester of FIG. 10.

Figure 12:
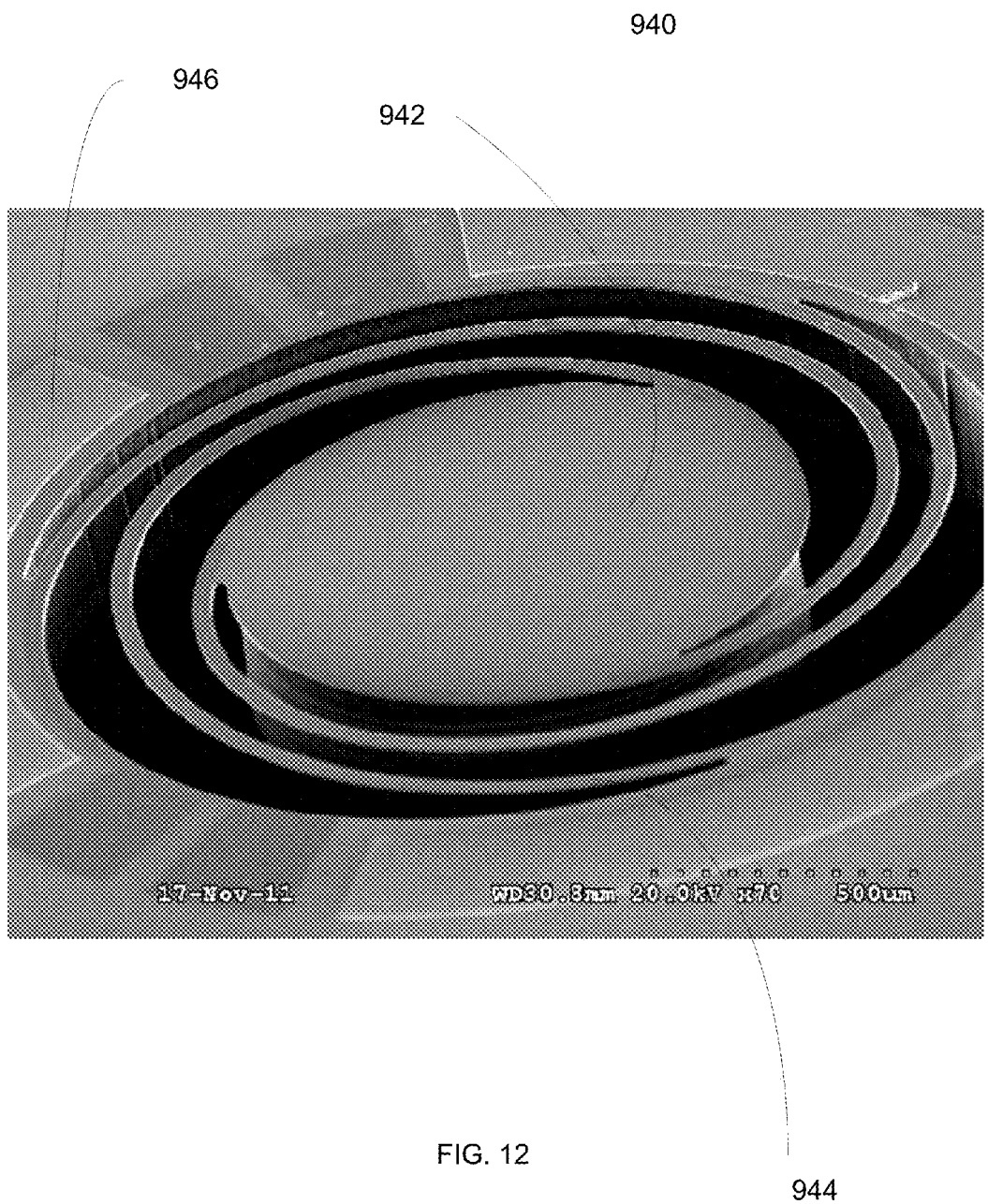
FIG. 12 is an image of an out-of-plane energy harvester taken from a scanning electron microscope, according to another embodiment of the present invention

FIG. 12 is another exemplary embodiment of the present invention. Shown is an image capture from a scanning electron microscope of multi-plane energy harvester 940. Proof mass 942 is moveably supported by spring transducers 944. As energy is imparted onto energy harvester 940, proof mass 942 is accelerated. Depending on the manner in which proof mass 942 and spring transducers 944 are constructed, proof mass 942 can be accelerated in one or more directions, including laterally, horizontally, vertically or varying degrees therein. Once proof mass 942 is accelerated, the kinetic energy of proof mass 942 is transferred to the combination of proof mass 942 and spring transducers 944. Spring transducers 944 cause a "spring" effect to be imparted on proof mass 942, causing proof mass 942 to move back and forth until the kinetic energy of proof mass 942 is transferred either to losses within harvester 940 or electrical energy via electrical energy output pad 946. Piezoelectric material can be deposited on various components of harvester 940, including, but not limited to, spring transducers 944 and proof mass 942.

Experimental Results

Fabricated devices are mounted on a stage that provides sinusoidal out-of-plane or in-plane acceleration $a_{in}$ with frequency $f_{in}$. The harvester output current is fed through a load resistance $R_L$ to a transimpedance amplifier (TIA). The TIA output voltage, which is proportional to the converted current, is measured by an oscilloscope.

In-Plane Energy Harvester

Figure 13A:
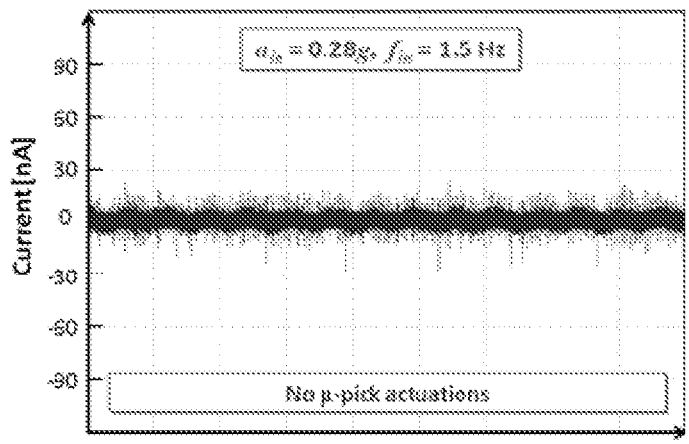
FIGS. 13a, 13b and 13c are waveforms showing energy output of an in-plane energy harvester, according to an embodiment of the present invention.
Figure 13B:
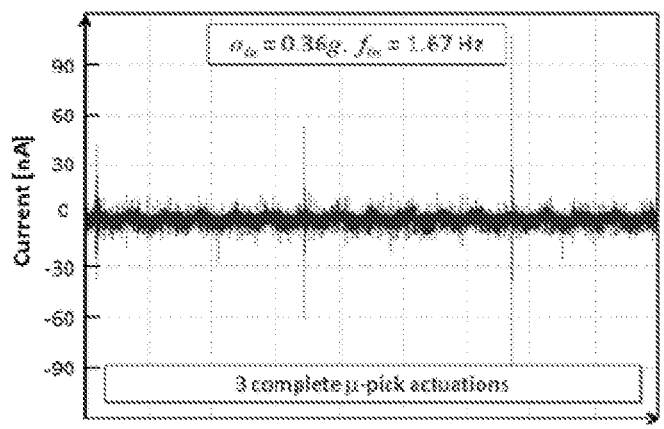
Figure 13C:
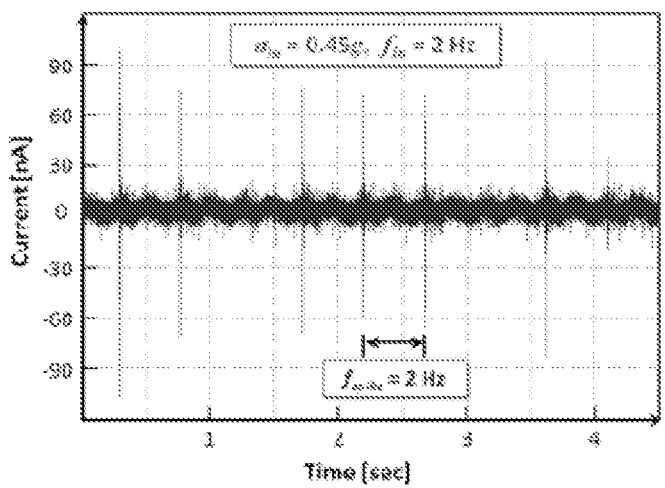
Figure 14:
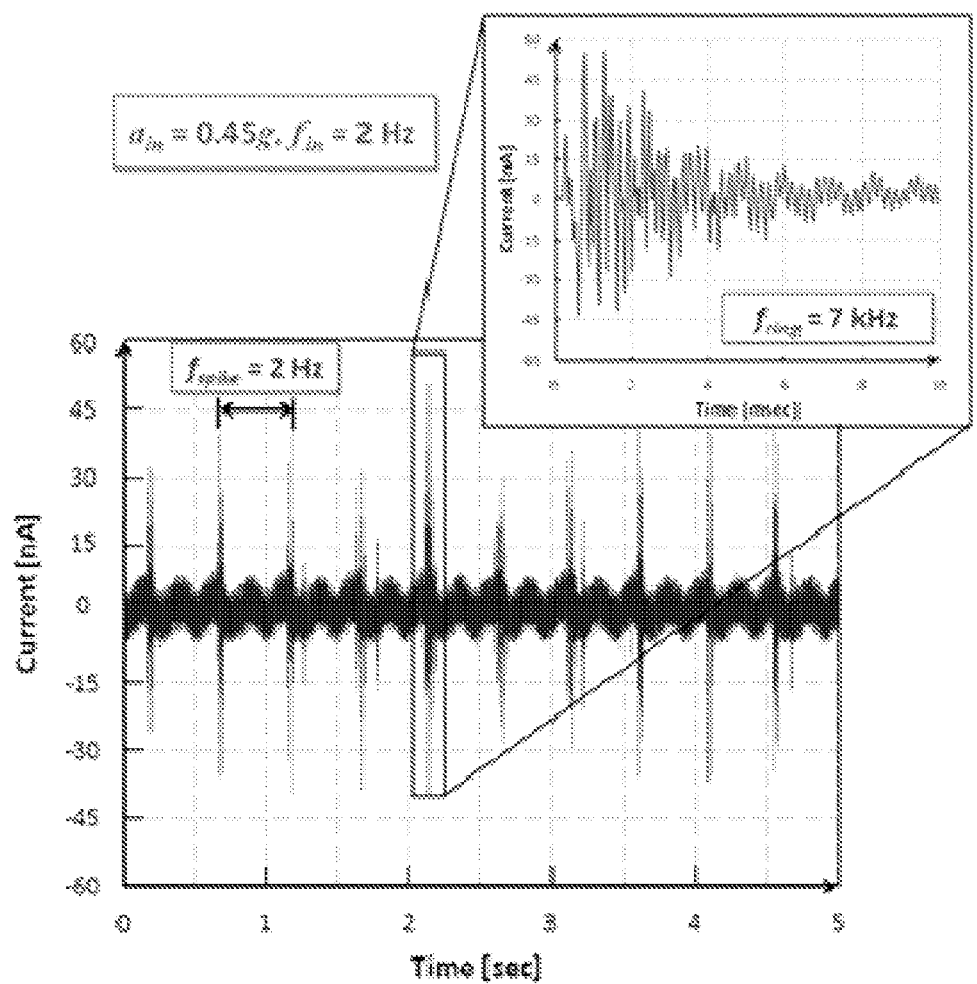
FIG. 14 is a waveform showing peak power output of an in-plane energy harvester, according to an embodiment of the present invention.

A single spring transducer of the in-plane harvester is connected to a TIA, and similar acceleration characterization is performed at lower frequencies. FIGS. 13a, 13b, and 13c show accelerations of 0.28 g, 0.36 g and 0.45 g, respectively. Based on preliminary measurements, a minimum acceleration of 0.45 g is required to induce periodic actuations of the spring transducer with an $f_{spike}$ equal to $f_{in}$. Missed actuations can result from imperfect μ-pick alignment due to slight tilting of the sample. For $a_{in}$=0.45 g and $f_{in}$=2 Hz, complete actuations of one in-plane spring transducer occur with $f_{spike}$=$f_{in}$. A single upconversion spike produces a peak power of 2.27 nW, as shown in FIG. 14. Spectral analysis shows signal components at $f_{ring}$=2 kHz and 7 kHz contained in the upconversion spikes, which are in close agreement with simulated spring modes.

While testing limitations prevented simultaneous measurement of both spring transducers, the total output current could nearly double as a result of the transducer symmetry. The cantilever transducers on the seismic mass, which are also covered with piezoelectric material, can be measured in conjunction with the spring transducer output. Power calculations were based on measured current and $R_L$. In-plane harvester measurements with load resistance $R_L$ from 560 to 560 kilo-ohm confirm that the output power can be maximized by selecting $R_L$ to approach the source impedance of the harvester.

Out-of-Plane Energy Harvester

Figure 15A:
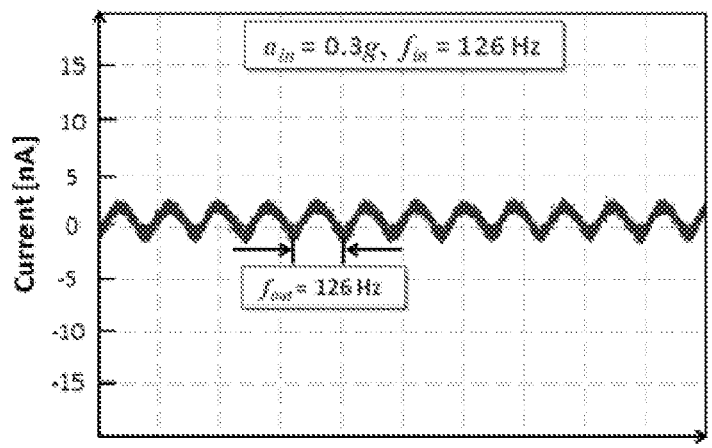
FIGS. 15a, 15b and 15c are waveforms showing energy output of an out-of-plane energy harvester, according to an embodiment of the present invention.
Figure 15B:
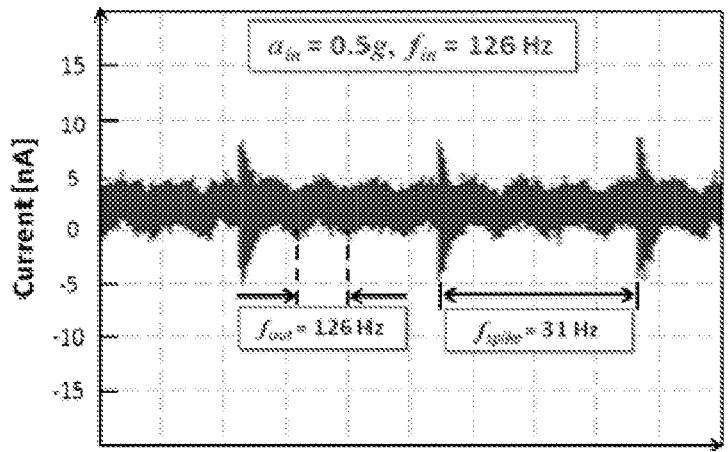
Figure 15C:
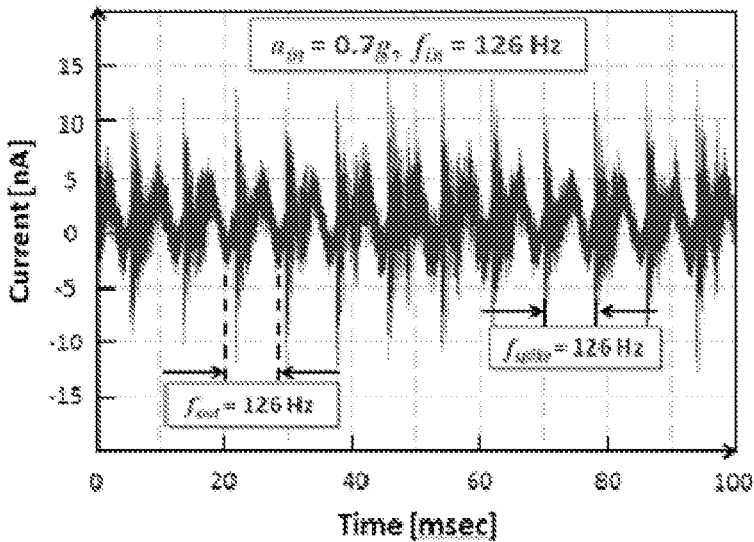
Figure 16:
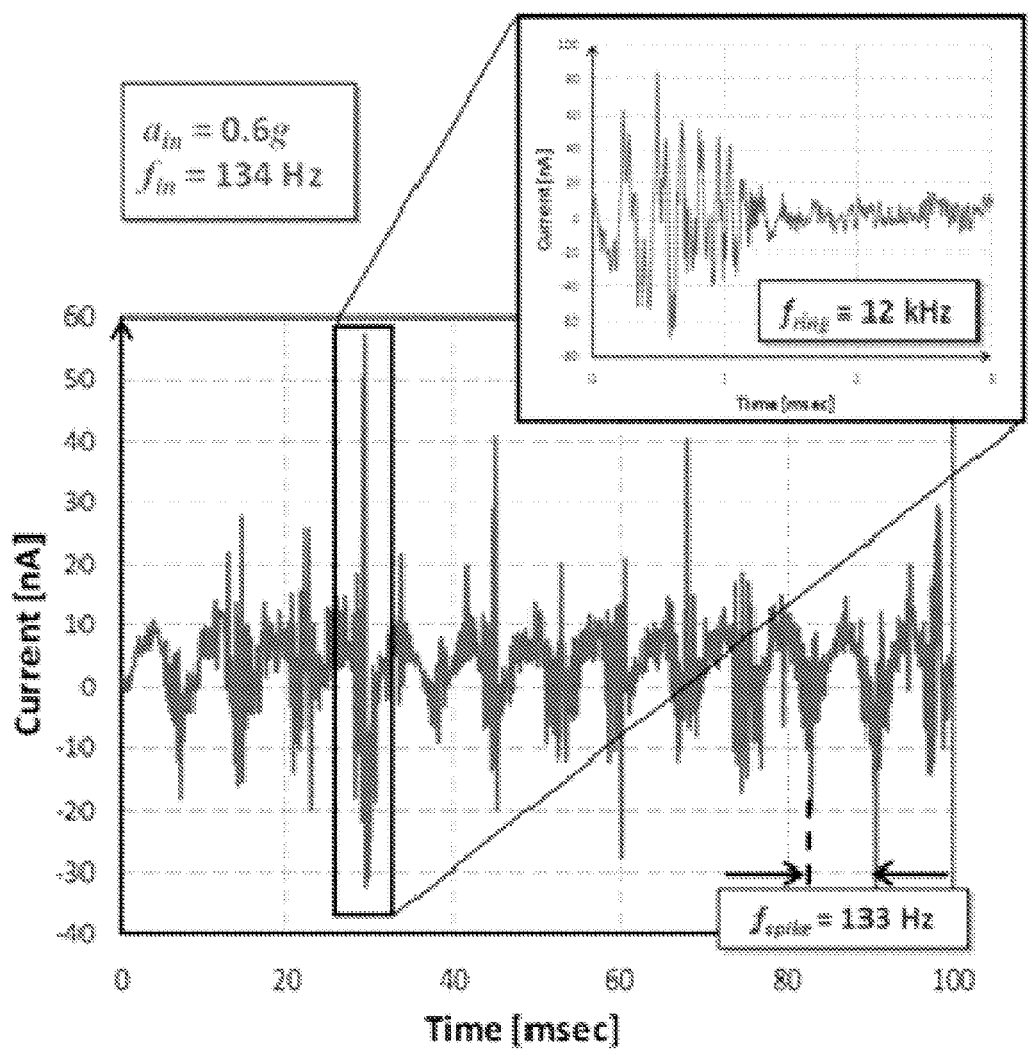
FIG. 16 is a waveform showing peak power output of an out-of-plane energy harvester, according to an embodiment of the present invention.

The out-of-plane harvester, with four beam transducer outputs connected in parallel, is first characterized over various accelerations at an input frequency close to the seismic mass resonance, shown as FIGS. 15a, 15b, and 15c with accelerations of 0.3 g, 0.5 g and 0.7 g, respectively. A sinusoidal output signal $f_{out}$=$f_{in}$=126 Hz is generated by the harvester, while increasing $a_{in}$ produces large transient current spikes occurring with frequency $f_{spike}$ in addition to the sinusoidal signal. When $a_{in}$ is increased to 0.7 g, $f_{spike}$ also becomes equal to $f_{in}$, shown in FIG. 15c. The output current impulses are found to have a main spectral component at $f_{ring}$ 12 kHz, shown in FIG. 16, which corresponds to the fundamental beam mode. A peak power of 3.23 nW is measured in response to a 134-Hz, 0.6 g acceleration input.

Methods of Manufacture

There are various methods that can be utilized to construct energy harvesters according to various embodiments of the present invention. FIGS. 17 and 18 illustrate an exemplary method of fabricating an energy harvester. In some embodiments, the method can produce a harvester that is monolithically realized on a single substrate, wherein the transducer element shares at least one common plane with the proof mass. In other words, a single plane can be identified in which both the transducer element and proof mass reside as a result of simultaneous construction of the transducer and proof mass by micro-fabrication techniques. The method illustrated in FIGS. 17 and 18 can enable multi-axis mechanical energy harvesting devices to be created using batch micro-fabrication techniques without requiring post-process assembly of external transducers, which can unnecessarily increase system size. Thus, in some embodiments, a substrate containing multiple types of energy harvesting devices in the present invention (out-of-plane, in-plane, multi-plane energy harvesters) can provide power regardless of the substrate orientation with respect to the vibration source.

In step 1 shown in FIG. 17, a silicon on insulator (SOI) wafer is provided with a deposition layer of aluminum nitride between molybdenum layers. At step 2, the top molybdenum layer is patterned to form sensing electrodes. At step 3, silicon dioxide is deposited and patterned on the backside of the SOI wafer. Continuing to FIG. 18, at step 4, the silicon dioxide layer is reduced to provide, in some embodiments, the flexibility to modify proof mass thickness during the fabrication process. Because the proof mass may influence the amount of harvestable power as well as resonance frequency of certain designs, step 4 allows each individual energy harvester device on the fabricated substrate to be tailored to a particular frequency or power specification, if desired. At step 5, aluminum nitride is etched to expose the bottom electrode. At step 6, trenches are etched into the SOI silicon device layer to define the proof mass, transducer, and all other features of the energy harvester device. At step 7, the backside silicon and buried oxide layers are completely etched to release the proof mass from the SOI wafer, leaving the device shown in step 8. In some instances, because the proof, or seismic mass can move in a direction sufficient to strike the sides of an energy harvester, the movement can cause minor damage to occur over time. Therefore, it can be desirable to manufacture within the energy harvester a shock stop, indicated in the device shown in step 8, which limits the amount of movement and reduces the impact of the seismic mass on the energy harvester. Additionally, a shock stop ensures that proof mass micro-pick 708 remains in alignment with spring transducer micro-pick 710 on in-plane harvester 700. A shock stop can be formed by removing the buried oxide such that the silicon device layer is released from the handle layer.

Exemplary Sensing and Energy Harvesting Platform

Figure 19A:
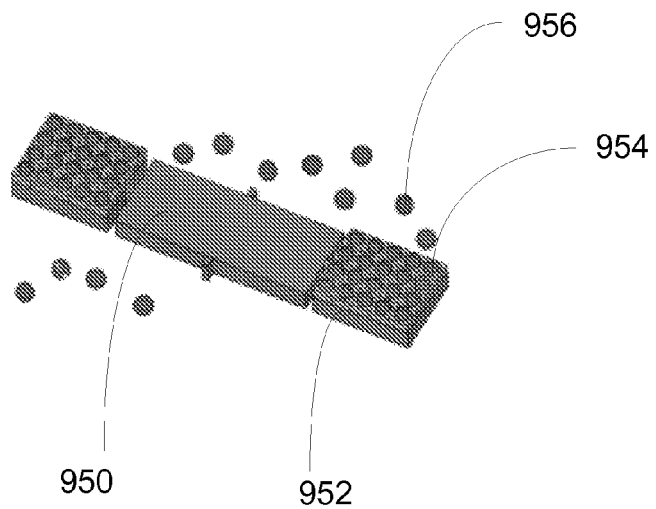
FIG. 19a illustrates a gravimetric sensor in combination with an energy harvester, according to an embodiment of the present invention.
Figure 19B:
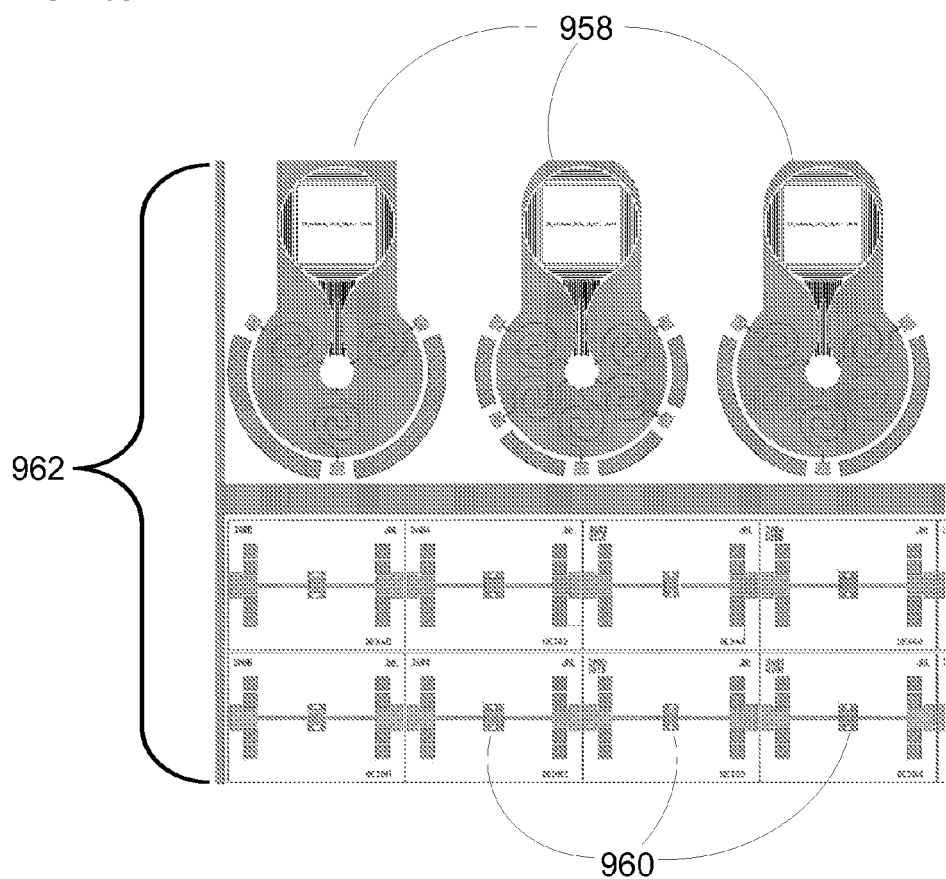
FIG. 19b illustrates energy harvesters integrated with gravimetric sensors, according to an embodiment of the present invention.

As previously noted, an energy harvester of the present invention can be integrated with one or more sensor components. The energy harvester can provide power to the sensor to provide a sensing output rather than a pure electrical output. In some embodiments, the sensor can be configured to alter the resonance output of the energy harvester. FIGS. 19*a* and 19*b* illustrate an embodiment of the present invention for using in gravimetric sensing in which the energy harvesting function and the sensing function are on a single, monolithic platform, whereby the sensor component alters the resonance output. Illustrated are a resonator body 950 and a annexed platform 952. Functional layer 954 is incorporated onto annexed platform 952. Functional layer 954 is designed to allow various materials, components, molecules, etc., 956 adhere or adsorb to it. The added mass from these sources 956 leads to a shift in the resonance frequency of resonator body 950 proportional to the added mass, so that by detecting the resonance frequency shift, the mass of source 956 can be determined. A plurality of energy harvesters 958 may be integrated with the gravimetric sensors 960 on the same platform or die 962, as shown in the exemplary photomask layout of FIG. 19*b*.

Figure 20:
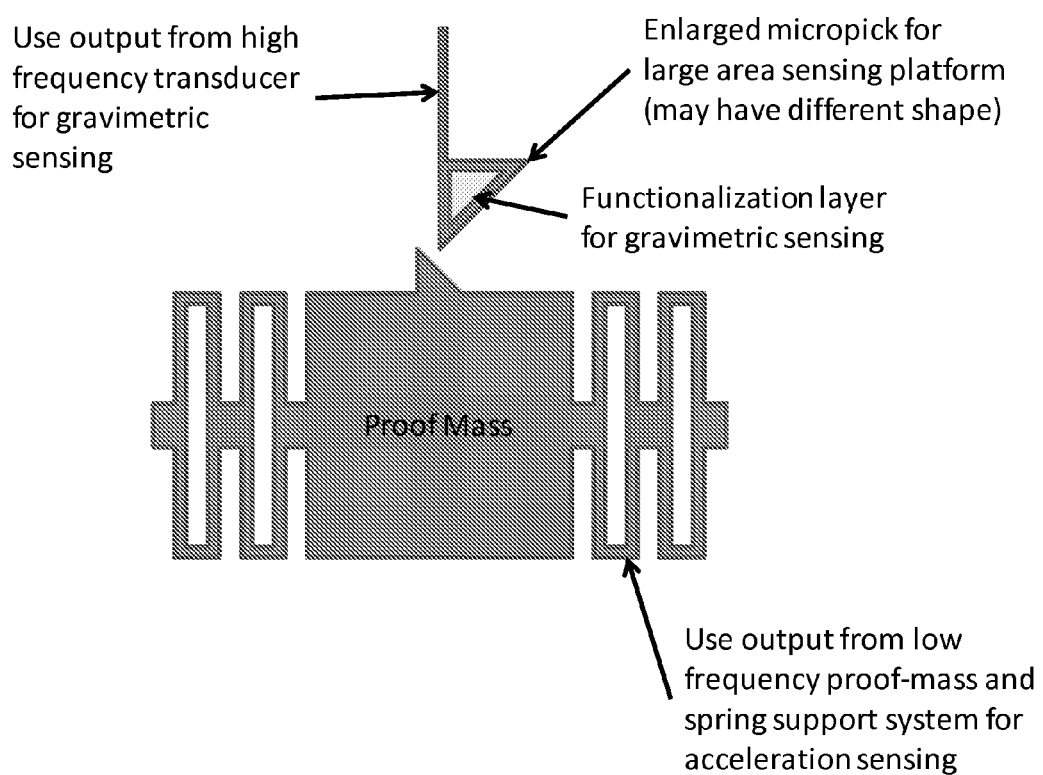
FIG. 20 illustrates an exemplary combined energy harvester, acceleration sensor, and gravimetric sensor, according to an embodiment of the present invention.

A further embodiment of the present invention is illustrated by FIG. 20. Here, the gravimetric sensing concept is applied to the high frequency transducer by coating or otherwise applying a functional layer to the surface of the transducer. Upon attachment of molecules to the functional layer, the shift in resonance frequency of the transducer element can be detected. In addition, the proof mass itself can be used to detect the input acceleration. The device can be regarded as a combined gravimetric and acceleration sensor with self-powered sensing elements powered by the energy harvester.

While the invention has been disclosed in its exemplary forms, it will be apparent to those skilled in the art that many modifications, additions, and deletions can be made therein without departing from the spirit and scope of the invention and its equivalents, as set forth in the following claims.

We claim:

1. A micromechanical device, comprising:
an energy harvester comprising:
a proof mass that receives ambient mechanical energy at a first frequency in a first plane;
a transducer comprising piezoelectric material; and
a transfer mechanism that transfers the received ambient mechanical energy to the transducer, causing the transducer to vibrate at its resonance frequency to create an electrical output energy at the resonance frequency to upconvert the frequency of the ambient mechanical energy to harvest energy,
wherein the proof mass, transducer, and transfer mechanism are monolithically integrated on a single substrate, and
wherein the transducer and proof mass are in common plane with the single substrate.

2. The micromechanical device of claim 1, wherein the transfer mechanism comprises only mechanical components.

3. A micromechanical device comprising:
a sensor component: and
an energy harvester comprising:
a proof mass that receives ambient mechanical energy at a first frequency in a first plane;
a transducer comprising piezoelectric material; and
a transfer mechanism that transfers the received ambient mechanical energy to the transducer, causing the transducer to vibrate at its resonance frequency to create an electrical output energy at the resonance frequency to upconvert the frequency of the ambient mechanical energy to harvest energy.

4. The micromechanical device of claim 3, wherein the sensor component, proof mass, transducer, and transfer mechanism are monolithically integrated on a single substrate.

5. The micromechanical device of claim 3, wherein the sensor component is in electrical communication with the energy harvester.

6. The micromechanical device of claim 3, wherein the sensor component is integrated with the energy harvester.

7. The micromechanical device of claim 3, wherein the sensor component is selected from the group comprising a gravimetric sensor and the transducer.

8. The micromechanical device of claim 3, wherein the sensor component is an accelerometer.

9. The micromechanical device of claim 8, wherein the output of the sensor component is proportional to the applied external acceleration.

10. The micromechanical device of claim 3, wherein the sensor component is covered by a functional layer.

11. The micromechanical device of claim 10, wherein a sensor component resonance frequency depends on a quantity of a substance attached or adsorbed to/on the functional layer.

12. The micromechanical device of claim 3, wherein the sensor component comprises the proof mass and a support spring system.

13. A micromechanical device comprising:
an energy harvester comprising:

a proof mass that receives ambient mechanical energy at a first frequency in a first plane, wherein the proof mass comprises a beam having a first mass at a first end of the beam and a second mass at a second, opposite end of the beam, wherein the first mass is greater than the second mass;
a transducer comprising piezoelectric material; and
a transfer mechanism that transfers the received ambient mechanical energy to the transducer, causing the transducer to vibrate at its resonance frequency to create an electrical output energy at the resonance frequency to upconvert the frequency of the ambient mechanical energy to harvest energy.

14. The micromechanical device of claim 13, wherein the transfer mechanism is a side wall of the mechanical energy harvester that receives an impact from the first mass when the first mass is accelerated towards the side wall due to the received ambient mechanical energy.

15. The micromechanical device of claim 14, wherein the transfer mechanism further comprises a deformation of the beam caused by the striking of the first mass against the side wall, wherein the deformation causes the second end of the proof mass to vibrate at the resonance frequency.

16. The micromechanical device of claim 15, wherein the transfer mechanism further comprises a first spring that connects the proof mass to the transducer, wherein the spring compresses and relaxes due to the vibration of the second end of the proof mass.

17. The micromechanical device of claim 16, wherein the transfer mechanism further comprises a plurality of second springs attached to the proof mass.

18. The micromechanical device of claim 16, wherein the first spring is a spiral pivot spring design.

19. A micromechanical device, comprising:
an energy harvester comprising:
a proof mass that receives ambient mechanical energy at a first frequency in a first plane, wherein the proof mass is a seismic mass that vibrates within the first plane upon receiving the ambient mechanical energy;
a transducer comprising piezoelectric material; and
a transfer mechanism that transfers the received ambient mechanical energy to the transducer, causing the transducer to vibrate at its resonance frequency to create an electrical output energy at the resonance frequency to upconvert the frequency of the ambient mechanical energy to harvest energy;
a proof mass micro-pick attached to the proof mass;
a transducer micro-pick attached to the transducer; and
wherein proof mass micro-pick causes the transducer to vibrate at the resonance frequency by striking the transducer micro-pick when the received ambient mechanical energy is of a predetermined value.

20. The micromechanical device of claim 19, wherein the transducer is a first spring transducer.

21. The micromechanical device of claim 20 further comprising:
one or more second transducers that vibrate at a second resonance frequency;
a plurality of second proof mass micro-picks attached to the proof mass;
a plurality of second transducer micro-picks attached to the one or more second transducers; and
wherein the plurality of second proof mass micro-picks load the plurality of second transducer micro-picks upon vibration of the proof mass, causing the one or more second transducers to vibrate at the second resonance frequency.

22. The micromechanical device of claim 19, further comprising a second seismic mass that vibrates within a second plane upon receiving the ambient mechanical energy in a second plane.

23. The micromechanical device of claim 1, wherein the transducer and transfer mechanism comprise a plurality of beam transducers attached to the proof mass, wherein the proof mass vibrates at the first frequency and one or more of the beam transducers vibrates at the resonance frequency.

24. The micromechanical device of claim 1, wherein the piezoelectric material is selected from the group comprising lead zirconate titanate, aluminum nitride, zinc oxide, lead magnesium niobate-lead titanate, gallium phosphate, quartz, tourmaline, and polyvinylidene fluoride and its copolymers.

25. An electrical energy generation device, comprising:
a mechanical energy harvester; and
an electrical system connected to the mechanical energy harvester to receive electrical energy from the mechanical energy harvester, wherein the mechanical energy harvester comprises:
a proof mass that receives ambient mechanical energy at a first frequency in a first plane, wherein the proof mass comprises a beam having a first mass at a first end of the beam and a second mass at a second, opposite end of the beam, wherein the first mass is greater than the second mass;
a transducer comprising piezoelectric material; and
a transfer mechanism that transfers the received ambient mechanical energy to the transducer, causing the transducer to vibrate at its resonance frequency to create an output voltage at the resonance frequency to upconvert the ambient mechanical energy.

26. The electrical energy generation device of claim 25, wherein the transfer mechanism is a side wall of the mechanical energy harvester that receives an impact from the first mass when the first mass is accelerated towards the side wall due to the received ambient mechanical energy.

27. The electrical energy generation device of claim 26, wherein the transfer mechanism further comprises a deformation of the beam caused by the striking of the first mass against the side wall, wherein the deformation causes the second end of the proof mass to vibrate at the resonance frequency.

28. The electrical energy generation device of claim 27, wherein the transfer mechanism further comprises a first spring that connects the proof mass to the transducer, wherein the spring compresses and relaxes due to the vibration of the second end of the proof mass.

29. The electrical energy generation device of claim 28, wherein the transfer mechanism further comprises a plurality of second springs attached to the proof mass.

30. The electrical energy generation device of claim 28, wherein the first spring is a spiral pivot spring design.

31. An electrical energy generation device, comprising:
a mechanical energy harvester;
an electrical system connected to the mechanical energy harvester to receive electrical energy from the mechanical energy harvester, wherein the mechanical energy harvester comprises:
a proof mass that receives ambient mechanical energy at a first frequency in a first plane, wherein the proof mass is a seismic mass that vibrates within the first plane upon receiving the ambient mechanical energy;
a transducer comprising piezoelectric material; and
a transfer mechanism that transfers the received ambient mechanical energy to the transducer, causing the transducer to vibrate at its resonance frequency to create an output voltage at the resonance frequency to upconvert the ambient mechanical energy;
a proof mass micro-pick attached to the proof mass;
a transducer micro-pick attached to the transducer; and
wherein proof mass micro-pick causes the transducer to vibrate at the resonance frequency by striking the transducer micro-pick when the received ambient mechanical energy is of a predetermined value.

32. An electrical energy generation device, comprising:
a mechanical energy harvester; and
an electrical system connected to the mechanical energy harvester to receive electrical energy from the mechanical energy harvester, wherein the mechanical energy harvester comprises:
a proof mass that receives ambient mechanical energy at a first frequency in a first plane;
a transducer comprising piezoelectric material; and
a transfer mechanism that transfers the received ambient mechanical energy to the transducer, causing the transducer to vibrate at its resonance frequency to create an output voltage at the resonance frequency to upconvert the ambient mechanical energy,
wherein the transducer and transfer mechanism comprise a plurality of beam transducers attached to the proof mass, wherein the proof mass vibrates at the first frequency and one or more of the beam transducers vibrate at the resonance frequency.

33. The electrical energy generation device of claim 25, wherein the piezoelectric material is selected from the group comprising lead zirconate titanate; aluminum nitride; zinc oxide; lead magnesium niobate-lead titanate, gallium phosphate, quartz, tourmaline, and polyvinylidene fluoride and its copolymers.

* * * * *